US009493377B2

(12) United States Patent
Jones

(10) Patent No.: US 9,493,377 B2
(45) Date of Patent: Nov. 15, 2016

(54) CERAMIC MATERIAL

(75) Inventor: Adam Jones, Abertillery (GB)

(73) Assignee: Atraverda Limited, Abertillery (GB)

( * ) Notice: Subject to any disclaimer, the term of this patent is extended or adjusted under 35 U.S.C. 154(b) by 1037 days.

(21) Appl. No.: 13/381,728

(22) PCT Filed: Jun. 30, 2010

(86) PCT No.: PCT/GB2010/001271
§ 371 (c)(1),
(2), (4) Date: Mar. 21, 2012

(87) PCT Pub. No.: WO2011/001147
PCT Pub. Date: Jan. 6, 2011

(65) Prior Publication Data
US 2012/0171569 A1 Jul. 5, 2012

(30) Foreign Application Priority Data
Jul. 3, 2009 (GB) .................... 0911616.1

(51) Int. Cl.
*B32B 27/04* (2006.01)
*H01B 1/08* (2006.01)
(Continued)

(52) U.S. Cl.
CPC ..... *C04B 35/6269* (2013.01); *C04B 35/62635* (2013.01); *C04B 35/634* (2013.01);
(Continued)

(58) Field of Classification Search
CPC .................... C04B 35/6269; C04B 35/62635; C04B 35/634; C04B 35/63452; C04B
(Continued)

(56) References Cited

U.S. PATENT DOCUMENTS 4,335,017 A * 6/1982 Miles et al. .............. 502/7
4,892,786 A * 1/1990 Newkirk .............. 428/307.3
(Continued)

FOREIGN PATENT DOCUMENTS

EP 0261067 A2 3/1988
GB 2304597 A 3/1997
(Continued)

OTHER PUBLICATIONS

"Tween 20 Product Information Sheet", Sigma-Aldrich.*
(Continued)

*Primary Examiner* — Carlos Barcena
*Assistant Examiner* — Lilia V Nedialkova
(74) *Attorney, Agent, or Firm* — Senniger Powers LLP

(57) ABSTRACT

A method of manufacturing a composite material, the method comprising: (i) providing a ceramic powder comprising ceramic agglomerates, the agglomerates having an intra-agglomerate void volume space; (ii) providing a polymer; (iii) mixing the polymer with the ceramic powder to form a mixture comprising the agglomerates at least partially impregnated with the polymer, wherein the volume of polymer in the mixture is at least 80% of the total intra-agglomerate void volume space, but less than 130% of the total intra-agglomerate void volume space; (iv) optionally shaping the mixture to form a preform; (v) and treating the mixture to provide ceramic agglomerates which are at least partially impregnated with solid polymer.

23 Claims, 5 Drawing Sheets

(51) Int. Cl.

| | | |
|---|---|---|
| H01B 1/12 | (2006.01) | |
| H01M 4/60 | (2006.01) | |
| C04B 35/626 | (2006.01) | |
| C04B 35/634 | (2006.01) | |
| H01M 4/20 | (2006.01) | |
| H01M 4/66 | (2006.01) | |
| H01M 4/82 | (2006.01) | |
| H01M 4/02 | (2006.01) | |

(52) U.S. Cl.
CPC ..... *C04B 35/6346* (2013.01); *C04B 35/63452* (2013.01); *H01M 4/20* (2013.01); *H01M 4/664* (2013.01); *H01M 4/82* (2013.01); *C04B 2235/3237* (2013.01); *H01M 2004/029* (2013.01); *Y02E 60/126* (2013.01); *Y02P 70/54* (2015.11)

(58) Field of Classification Search
CPC ............. 35/6346;C04B 2235/3237; H01M 4/20; H01M 4/664; H01M 4/82; H01M 2004/029; Y02E 60/126; Y02P 70/54
See application file for complete search history.

(56) References Cited

U.S. PATENT DOCUMENTS

| | | | |
|---|---|---|---|
| 4,923,658 A | 5/1990 | Hover et al. | |
| 5,001,091 A | 3/1991 | Pujari et al. | |
| 5,173,215 A * | 12/1992 | Clarke | ............. 423/608 |
| 6,171,460 B1 | 1/2001 | Bill | |
| 7,306,824 B1 | 12/2007 | Coker | |
| 2004/0072074 A1* | 4/2004 | Partington | ............. 429/231.5 |

FOREIGN PATENT DOCUMENTS

| | | |
|---|---|---|
| JP | 02194911 A | 8/1990 |
| WO | 02/058174 A2 | 7/2002 |
| WO | WO 2009024776 A1 * | 2/2009 |

OTHER PUBLICATIONS

"Celite 545 Product Information Sheet".*
IUPAC. Compendium of Chemical Terminology, 2nd Ed. (the "Gold Book"). Compiled by A.D. McNaught and A. Wilkinson. Blackwell Scientific Publications, Oxford (1997).*
Great Britain Search Report, GB0911616.1, dated Nov. 4, 2009, 5 pages.
Abstract of JP02194911; Aug. 1, 1990.
International Search Report and Written Opinion, PCT/GB2010/001271, dated Dec. 10, 2011, 17 pages.
Yamada et al., "Observation and analysis of the infiltration of polymer liquids into carbon black agglomerates", Chemical Engineering, Science, vol. 53, No. 11, pp. 1963-1972, 1998.

* cited by examiner

CERAMIC MATERIAL

REFERENCE TO RELATED APPLICATIONS

This application is the U.S. national stage application of International Patent Application No. PCT/GB2010/001271, filed Jun. 30, 2010, and claims the benefit of Great Britain Application No. 0911616.3, filed Jul. 3, 2009, the entire disclosures of which are incorporated herein by reference.

FIELD OF THE INVENTION

The present invention relates to a ceramic composite material, uses thereof and a method of manufacturing the ceramic material. In particular, the present invention relates to ceramic electrodes for use in a battery, and specifically for use in a bipolar-lead-acid battery.

BACKGROUND OF THE INVENTION

Bipolar lead-acid batteries are known in the art. There is a continuing need to provide improved components for such batteries, and to provide improved methods of making such components.

International patent application no. PCT/GB02/00230 describes electrodes comprising a shaped substantially pore-free body of hardened resin, the body having electrical paths defined by contacting particles of titanium suboxide of the formula $Ti_nO_{2n-1}$ where n is 4 or greater. The method of making the electrodes comprises mixing an unhardened thermosettable resin, a hardener therefore and conductive particles.

SUMMARY OF THE INVENTION

It is an object of the present invention to overcome at least some of the disadvantages of the prior art.

According to a first aspect there is provided a method of manufacturing a composite material, the method comprising:
(i) providing a ceramic powder comprising ceramic agglomerates, the agglomerates having an intra-agglomerate void volume space;
(ii) providing a polymer;
(iii) mixing the polymer with the ceramic powder to form a mixture comprising the agglomerates at least partially impregnated with the polymer, wherein the volume of polymer in the mixture is at least 80% of the total intra-agglomerate void volume space, but less than 130% of the total intra-agglomerate void volume space;
(iv) optionally shaping the mixture to form a preform; and
(v) treating the mixture to provide ceramic agglomerates which are at least partially impregnated with solid polymer.

In one embodiment of the present invention steps (i), (ii), (iii), (iv), and (v) are carried out sequentially in numerical order. Alternatively, the order of carrying out the steps may differ. It will be understood that some of the steps may be carried out simultaneously. For example, the step (iv) may be carried out simultaneously with step (v). Steps (i) and (ii) may be carried out in a sequential order, in a reversed order, or in parallel.

According to a second aspect of the present invention there is provided a composite material obtainable by the method as defined herein.

According to a third aspect of the present invention there is provided an electrode comprising the composite material as defined herein.

According to a fourth aspect of the present invention there is provided a battery comprising the electrode as defined herein.

According to a fifth aspect there is provided discrete particles comprising a ceramic which is at least partially impregnated with a curable polymer.

DETAILED DESCRIPTION OF THE PREFERRED EMBODIMENTS

Figure 1:
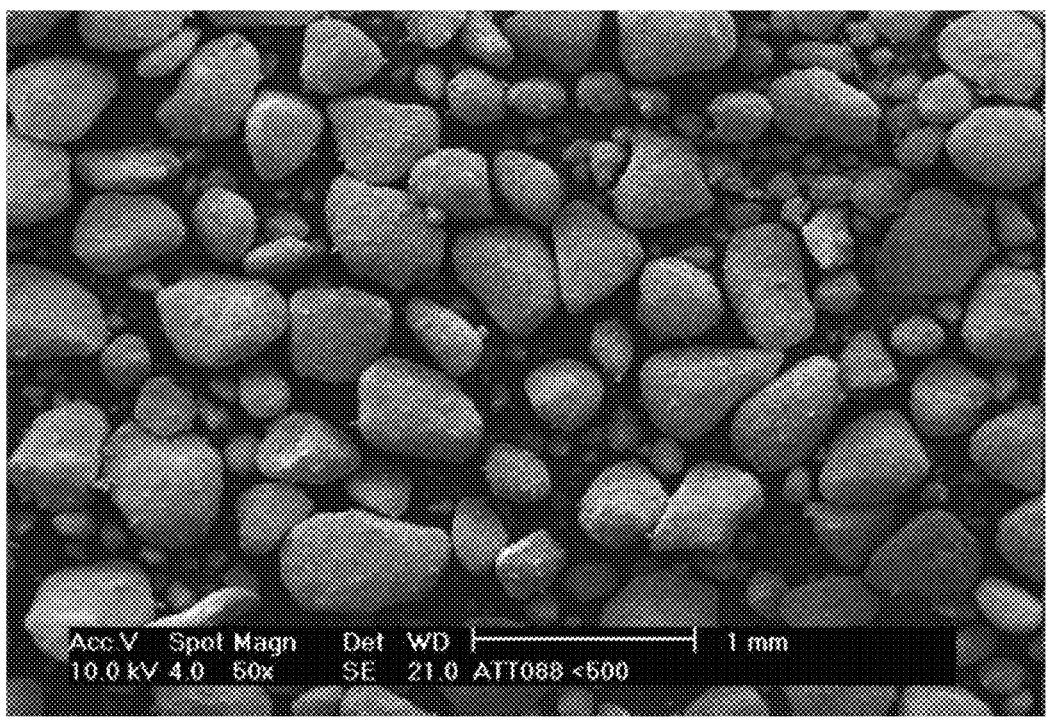
FIG. 1: Low magnification SEM micrograph of ceramic raw material.

Each aspect as defined herein may be combined with any other aspect or aspects unless clearly indicated to the contrary. In particular any feature indicated as being preferred or advantageous may be combined with any other feature or features indicated as being preferred or advantageous.

As outlined above, International patent application no. PCT/GB02/00230 describes electrodes. The method of making the electrodes comprises mixing an unhardened thermosettable resin, a hardener therefore and conductive particles. This document teaches that when manufacturing the body it is preferred to have a slight excess of a thermoset resin. Excess resin is rejected from the mould as "flash" before cure of the material occurs in a press, under pressure. Example 1 of PCT/GB02/00230 discloses mixing approximately 33% by weight of heated resin and hardener together with 66% by weight of Magneli suboxide powder to form a dough. The dough is then moulded, heated and formed into plates. When the heated resin and hardner is mixed with the powder, the Magneli suboxide powder is thoroughly coated in the resin/hardner mix. One of the problems of this method is that the EBONEX® powder has a tendency to be porous, and air may become trapped in the powder within the resin mixture. When the resin is cured, this air is trapped within the plates. The trapped air reduces the electrical conductivity of the plates. This is disadvantageous when the plates are for use as electrodes. It has also been found that upon compression of the resin/hardner/powder mix to form electrode plates, it is difficult to form plates having an even or substantially even distribution of the resin/hardner/powder mix throughout the plate. Instead, regions high in resin are formed. As the resin is not electrically conductive, such regions are disadvantageous when used as an electrode.

The titanium suboxide particles (known as EBONEX® powder) used in the prior art processes are produced via a furnace process in the form of porous ceramic agglomerates. Unfortunately, these agglomerates tend to be brittle and therefore do not lend themselves to manufacturing processes which employ high shear stage(s) and/or high pressure gradients. The particle size distribution is likely to shift downwards during downstream processes.

The present inventors have developed an alternative and improved method of forming a composite material, and one which has suitable electrical conductivity when formed from electrically conductive materials.

The present inventors have found that it is advantageous to provide "pre-impregnated" agglomerates. The present method preferably involves at least partially, preferably substantially and more preferably fully impregnating the ceramic agglomerates with a polymer. Preferably the at least partially, preferably substantially, and more preferably fully impregnated ceramic agglomerates still have some granular flow characteristics similar to the agglomerates prior to impregnation. The granular flow characteristics may be measured, for example on a Freeman Tech FC4 Rheometer. The impregnated or partially impregnated agglomerates have a higher density and are potentially more robust than the unfilled-porous agglomerates. Thus they may be subjected to higher shear stage(s) and/or high pressure gradients with fewer adverse affects. Thus, manufacturing processes which employ high shear stage(s) and/or high pressure gradients which would typically not be suitable for processing porous ceramic agglomerates and/or particles may be used if the ceramics are at least partially impregnated with a polymer. Thus, by pre-impregnating the ceramic agglomerates a wider variety of methods may be used to form and/or shape the material which are not possible using prior art methods without negatively affecting the end product.

Additionally, as the void volume space within the agglomerates is at least partially filled within the polymer, the amount of air which is trapped with the end product formed from the particles is greatly reduced.

Furthermore, typically the materials formed using the method described herein provides a final product which has improved strength compared to a product formed from porous ceramics.

The method of the present invention also has the advantage of requiring less resin/hardener or polymer than the prior art methods, whilst still producing composite materials having satisfactory electrical conductivity.

As used herein the term "agglomerate" describes an assemblage of particles rigidly joined together. The particles may be joined together as a result of, for example, partial fusion or sintering.

For example, methods of making EBONEX® powder, which comprises $Ti_4O_7$, $Ti_5O_9$, and $Ti_6O_{11}$, are well known in the art, see for example, PCT/GB2005/002172. The method involves heating titanium oxide in a furnace under reducing conditions. The resulting EBONEX® powder is produced in the form of a collection of agglomerates.

The ceramic powder of the present invention comprises ceramic agglomerates. The ceramic agglomerates have an intra-particle void volume space. The void volume space between the agglomerates in the powder is defined as the inter-particle void volume space. The intra-agglomerate void volume space is void volume space or pore volume within an individual agglomerate. The porosity of each agglomerate may be defined as:

$$\frac{\text{Volume of void space within an agglomerate}}{\text{Total or bulk volume of the agglomerate including the solid and void components}}$$

The inter-agglomerate void volume space of the agglomerate is the void volume space between agglomerates.

The total void volume space of the powder is the sum of the intra-agglomerate void volume space and the inter-agglomerate void volume space.

The porosity of the powder is:

$$\frac{\text{Total void volume space}}{\text{Total or bulk volume of the powder including the solid and void components}}$$

It will be understood that within the powder, the agglomerate size and shape may vary. Similarly the porosity of each agglomerate within a given agglomerate may vary.

The inter-agglomerate and/or intra-agglomerate porosity may be measured using Mercury Porosimetry, for example using a Micrometritics AutoPore IV. Typically the Mercury Porosimetry measurements are taken on the agglomerate sample in a powder form.

Mercury Porosimetry experiments of the ceramic agglomerates show a bimodal distribution of pore sizes (void volume spaces). This can be clearly seen with reference to FIG. 5. The peak which corresponds to the smaller pore size (void volume space) diameter corresponds to the pore size diameter of the intra agglomerate voids, as shown by A in the FIG. 5. (A shows the intra-agglomerate porosity). The peak which corresponds to the larger pore size diameter corresponds to the pore size (void volume space) diameter of the inter-agglomerate voids.

Mercury porosimetry is a well known technique and allows the total volume of the ceramic agglomerates to be determined, as well as the volume of pores of different sizes. A known mass of the ceramic agglomerates is submerged in mercury. Typically, at ambient pressure, mercury does not invade the interagglomerate void volume spaces or the pores (intra-agglomerate void volume spaces) of the sample. As the pressure is increased, mercury invades first the larger pores, then the smaller pores. The relationship between pore diameter and the pressure is measured. A continuous trace of pressure versus volume is then generated, which allows for a complete characterization of the sample's porosity.

The modal intra-agglomerate voids may have an equivalent spherical diameter which is less than 10 microns, less than 8 microns, less than 6 microns and preferably less than 3 microns. Typically, the modal intra-agglomerate voids have an equivalent spherical diameter which is less than 3 microns. Typically there is an interconnectivity of the intra-agglomerate voids within the agglomerates with the inter-agglomerate voids.

For the avoidance of doubt, by the term inter-agglomerate voids is meant an agglomerate containing pores (void volume spaces) between neighbouring particles, the pores or spaces having a modal diameter $d_{mode}$ of at least 20 microns, preferably at least 30 microns, still more preferably at least 40 microns.

The present inventors have found that in a typical batch of EBONEX® powder, which comprises $Ti_4O_7$, $Ti_5O_9$, and $Ti_6O_{11}$. Preferably the powder comprises:

$30\% \leq Ti_4O_7 \leq 60\%$ $35\% \leq Ti_5O_9 \leq 60\%$ and $2\% \leq Ti_6O_{11} \leq 20\%$.

In order to fill approximately 100% of the total intra-agglomerate void volume space it is necessary to add approximately 23% by weight of epoxy resin based on the total weight of the mixture (the sum of the epoxy resin and the agglomerate).

At least 80% of the total intra-agglomerate void volume space within the powder is preferably interconnected with the inter-agglomerate void volume space, more preferably at least 85%, still more preferably at least 90%, still more preferably at least 95%. In other words, the vast majority of intra-agglomerate void volume space (preferably at least 80%) within the powder are open micropores.

Without wishing to be bound by any particular theory, the present inventors note that the porosity of the agglomerates is composed mainly of open pores (that are, by their nature, highly tortuous and interconnected). This combined with the wettability of the agglomerate surfaces (interfacial energy) and the low viscosity of the liquid means that they are able to soak up liquids through wetting/capillary action from the exterior. If the particle-liquid interfacial energy is less than the particle vapour energy the work of saturation will be negative and infiltration will not require the application of an external force i.e. it will be spontaneous. The same wetting/capillary action is also present outside between the agglomerates; however the forces are far lower than the intra-agglomerate forces. The inter-agglomerate pores are larger in diameter than the intra-agglomerate pores. The consequences of this difference is that liquid preferentially fills the intra-agglomerate porosity first if the displaced air is allowed to escape out of the mix unhindered; only when this has been essentially filled does the liquid begin to fill the inter-particle voids.

Step (iii) of the present invention involves mixing the polymer with the ceramic powder to form a mixture comprising the agglomerates at least partially impregnated with the polymer, wherein the volume of polymer in the mixture is at least 80% of the total intra-agglomerate void volume space, but less than 130% of the total intra-agglomerate void volume space. More preferably, the volume of polymer in the mixture is at least 90% of the total intra-agglomerate void volume space, but less than 110% of the total intra-agglomerate void volume space, or at least 95% of the total intra-agglomerate void volume space, but less than 105% of the total intra-agglomerate void volume space. Most preferably, the volume of polymer in the mixture is at least 98% of the total intra-agglomerate void volume space, but less than 102% of the total intra-agglomerate void volume space.

The term "ceramic" as used herein is used to mean an inorganic, non-metallic solid prepared by the action of heat and subsequent cooling.

The ceramic used in the present invention may be a conductive ceramic. When the material is for use as a plate in an electrode the ceramic will preferably be an electrically conductive ceramic.

As used herein the term "conductive ceramic" means that the ceramics are electrically conductive. Preferably the material has a resistance of less than 8 mΩ.

Porous varieties of ceramics may be formed by sintering or hot pressing. The ceramics may comprise a single species, a mixture of species and/or doped ceramics. Single species ceramics comprise those ceramics that are made from a single chemical compound.

Ceramic powders comprising a mixture of species contain more than one chemical compound. The ceramic powders may include a combination of electrically conductive and non-conductive compounds or the combination of two or more electrically conductive compounds. Doped electrically conductive ceramics comprise non- or weakly-electrically conductive ceramics that are doped with materials that are highly electrically conductive, such as metals or certain metallic oxides.

Suitable electrically conductive ceramics include refractory metal and semi-metal oxides, silicates, borides, carbides, and nitrides which exhibit electrical conductivity or those which do not exhibit electrical conductivity may be doped to achieve varying degrees of electrical conductivity. As used herein refractory metals include Ti, V, Cr, Zr, Nb, Mo, Hf, Ta, W and Re. Examples of single species electrical conductive ceramics include titanium suboxides, titanium and zirconium diborides, titanium nitride, carbides of titanium, boron, and silicon, certain oxides of metal (e.g., NiO), as well as lithium and manganese ferrites, and iron titanate. The conductivities of these materials range from highly conductive to having conductivity comparable to semiconductors.

Examples of such electrical conductive ceramics include combinations of bismuth oxide and yttria stabilized zirconia, niobium carbide and titania or zirconia, nitrides of titanium and aluminum, nitrides of silicon and zirconium, nitrides of silicon and titanium, zirconium diboride and silicon carbide/carbon, refractory oxides and indium or tin oxide, zirconia solid solutions and oxides of neodymium, cerium, dysprosium or erbium, silicon nitride and silicon carbide, and solid solutions of strontium zirconate maganates.

Examples of doped ceramics include aluminum nitride made conductive by addition of transition metal oxides and niobium doped strontium titanate. In general, rare earths, because of their wide range of valence states, comprise dopants that are most easily incorporated into the mixed stoichiometry of many ceramics for the purpose of imparting electrical conductivity.

Preferably the conductive ceramic powder comprises titanium suboxide having the formula $Ti_nO_{2n-1}$ where n is 4 or greater. Preferably, n is a number from 4 to 10. Such ceramics are highly conductive and may be formed by sintering the powdered form of Magneli phase titanium suboxides. Magneli phases are members of the homologous series of the general formula $TiO_nO_{2n}$ where n is a number between 4 and 10. These ceramics are surprisingly corrosion resistant.

When the powder comprises titanium suboxide, preferably the titanium suboxide is selected to provide a high level of conductivity. $Ti_4O_7$ and/or $Ti_5O_9$ are preferred. Some suboxides have low conductivity and poor corrosion resistance and preferably are avoided if the material is for use in an electrode; an example is $Ti_3O_5$. Although the titanium suboxide may be provided as a mixture of the Magneli phases it is important that the presence of lower oxides such as TiO, $Ti_2O_3$, $Ti_3O_5$ is minimised and preferably entirely avoided if the material is for use in an electrode.

Preferably the powder comprises at least 50% by weight or at least 80% by weight of $Ti_4O_7$ and/or $Ti_5O_9$ based on the total weight of agglomerate. More preferably, the powder comprises at least 85% by weight or at least 90% by weight of $Ti_4O_7$ and/or $Ti_5O_9$ based on the total weight of ceramic.

Preferably, the powder comprises $30\% \leq Ti_4O_7 \leq 60\%$ $35\% \leq Ti_5O_9 \leq 60\%$ and $2\% \leq Ti_6O_{11} \leq 20\%$.

In one embodiment the powder comprises $Ti_4O_7$ in an amount of from 30% to 60% by weight based on the total weight of the powder. Having amounts of $Ti_4O_7$ greater than 60% in the powder may be disadvantageous because corrosion resistance may be adversely affected. In contrast if $Ti_4O_7$ is present in less than 30% by weight based on the total weight of the powder, the conductivity of the resulting electrode or shaped article may be adversely affected.

In one embodiment of the present invention $Ti_5O_9$ is present in the powder in an amount of from 35% to 60% by weight based on the total weight of the powder. Having amounts of $Ti_5O_9$ greater than 60% in the powder may be disadvantageous due to the higher resistance articles obtained. In contrast if $Ti_5O_9$ is present in less than 35% by weight based on the total weight of the powder, corrosion resistance may be adversely affected due to the higher quantities of $Ti_4O_7$ and $Ti_3O_5$ phases.

Preferably the $Ti_4O_7$, $Ti_5O_9$ and $Ti_6O_{11}$ provides over 95% of the powder and most preferably over 96%, 97%, 98%, 99%, e.g. 100%.

Preferably the powder comprises less than 5% of a titanium suboxide other than $Ti_4O_7$, $Ti_5O_9$ and $Ti_6O_{11}$ based on the total weight of the agglomerate. More preferably the powder comprises less than 2%, less than 1%, or less than 0.5% of a titanium suboxide other than $Ti_4O_7$, $Ti_5O_9$ and $Ti_6O_{11}$ based on the total weight of the powder.

Preferably the total amount in the powder of $Ti_4O_7$, $Ti_5O_9$ and $Ti_6O_{11}$ together with unavoidable impurities totals 100%.

Preferably, the agglomerate size distribution of the porous ceramic agglomerates is selected so that the agglomerates will contact each other intimately in the composite material. This allows the prospect of excellent densification behaviour of a pressed article made from such agglomerates. Moreover when the ceramic is a conductive ceramic and the material is for use as an electrode, this also creates electrical paths and provides conductivity. Preferably the powder size distribution is relatively narrow since this provides improved strength and optionally gives good electrical connectivity. Preferably the agglomerates have an agglomerate size distribution with a standard deviation of less than about 50% of the mean particle size. Polymodal mixtures may also be used but care must be taken to ensure that the populations of smaller agglomerates do not reduce the electrical connectivity of the populations of larger agglomerates when the material is for use as an electrode.

Specific agglomerate sizes and agglomerate size distributions may be required for making electrodes of a specific thickness but a mean agglomerate size (by volume) of around 200 to 500 micrometers is suitable for an electrode of 1 to 2 mm thickness.

Titanium suboxide powder may be manufactured by methods such as those described in U.S. Pat. No. 5,173,215. If the material is for use as an electrode, the manufacturing conditions may be adjusted to ensure that the powder has a high proportion of the $Ti_4O_7$ and $Ti_5O_9$ crystallography (to produce high conductivity) and effectively none of the non-Magneli $Ti_3O_5$ material (which causes poor corrosion resistance and low conductivity).

The polymer as used herein preferably is initially in a liquid form which can be processed to into a solid.

Preferably the polymer is provided into the mixture at a temperature which results in a sufficiently low viscosity to enable rapid impregnation to occur. Preferably the polymer provided has a viscosity in the range of 10,000 to 3 centiPoise, or from 8,000 to 100 centiPoise [1 cP is 1 mPa·s] during the impregnation process. Preferably the polymer may be provided at a temperature of from 15-40° C., preferably 20-30° C.

Impregnation of the ceramic agglomerates with the polymer may be achieved in a number of different ways.

The polymer may be dissolved in a solvent forming a solution preferably having a high solute percentage. This solution can be infiltrated and/or impregnated in various ways into the porous ceramic and the solvent caused to evaporate leaving the polymer deposited within the ceramic.

In one embodiment the present invention comprises a method of manufacturing a composite material, the method comprising:
  (i) providing a ceramic powder comprising ceramic agglomerates, the agglomerates having an intra-agglomerate void volume space;
  (ii) providing a polymer dissolved in a solvent;
  (iii) mixing the solvent comprising the polymer with the ceramic powder to form a mixture comprising the agglomerates at least partially impregnated with the polymer,
    wherein the volume of polymer in the mixture is at least 80% of the total intra-agglomerate void volume space, but less than 130% of the total intra-agglomerate void volume space;
  (iv) optionally shaping the mixture to form a preform; and
  (v) evaporating the solvent from the mixture to provide ceramic agglomerates which are at least partially impregnated with solid polymer.

Impregnation of the intra-agglomerate porosity of the ceramic agglomerate may be achieved using a solid-polymer-forming liquid. The process of impregnation may optionally include evacuation of the pores of the ceramic by vacuum and/or potentially thermal means, followed by infiltration of the ceramic with a solid polymer-forming liquid, and subsequent curing of the liquid in situ to form a solid polymer component. The infiltration may optionally be pressurized.

In one embodiment the present invention comprising a method of manufacturing a composite material, the method comprising:
  (i) providing a ceramic powder comprising ceramic agglomerates, the agglomerates having an intra-agglomerate void volume space;
  (ii) providing a liquid polymer;
  (iii) mixing the liquid polymer with the ceramic powder to form a mixture comprising the agglomerates at least partially impregnated with the polymer, wherein the volume of polymer in the mixture is at least 80% of the total intra-agglomerate void volume space, but less than 130% of the total intra-agglomerate void volume space;
  (iv) optionally shaping the mixture to form a preform; and
  (v) curing the mixture to provide ceramic agglomerates which are at least partially impregnated with solid polymer.

Curing of the solid polymer-forming liquids (liquid polymer) may be achieved by means well known in prior art such as the use of heat, pressure, radiation exposure and combinations of thereof. The term "curing" as used herein is the chemical process undergone by a polymer in which the polymer hardens (from a liquid) to form a solid by cross-linking of the polymer chains. The cross-linking may be initiated or accelerated by heat. It may be initiated by chemical additives, or hardeners. Curing may occur at room temperature.

As outlined above, suitable curable polymers includes resins. Suitable resins include: Bispenol-A and/or -F epoxy, Phenol formaldehyde (aka 'novalac') epoxy, resorcinol modified phenol novalac epoxy resins.

The polymer may comprise a curing agent. Preferably the polymer will comprise less than 20% by weight of curing agent based on the total weight of the polymer. For epoxy polymers, typically between 15% and 20% of the total weight of the polymer will comprise a curing agent. Suitable amounts of curing agent for specific polymers are well known to the skilled person will typically be made available by manufacturers of the curing agents.

Suitable curing agents include: polyamine, cycloaliphatic polyamine, aliphatic polyamine, polyetherurethane, polymercaptane, polyamidoamine, polyaminoimidazoneline.

2-ethyl-4-methylimidazole, 3,3'-Diaminodiphenyl sulphone, Boron Trichloride amine adduct, Isophorone diamine and mixtures of two or more thereof.

Molten thermoplastic polymers may also be used to impregnate the agglomerates. Optionally the ceramic pores may be evacuated, and the pores of the ceramic infiltrated with molten thermoplastic. The infiltration may optionally be pressurized. The thermoplastic penetrates the porous ceramic. The thermoplastic is then allowed to harden.

In one embodiment the present invention comprises a method of a method of manufacturing a composite material, the method comprising:
(i) providing a ceramic powder comprising ceramic agglomerates, the agglomerates having an intra-agglomerate void volume space;
(ii) providing a molten thermoplastic polymer;
(iii) mixing the molten thermoplastic polymer with the ceramic powder to form a mixture comprising the agglomerates at least partially impregnated with the polymer,
wherein the volume of polymer in the mixture is at least 80% of the total intra-agglomerate void volume space, but less than 130% of the total intra-agglomerate void volume space;
(iv) optionally shaping the mixture to form a preform; and
(v) cooling the mixture to provide ceramic agglomerates which are at least partially impregnated with solid polymer.

Preferably the mixture is cooled to room temperature (from 20 to 25° C.)

Any suitable polymer may be used in the present invention. The polymer may be or comprise a thermosetting polymer and/or a thermoplastic polymer.

Preferably if the composite material is for use as an electrode the polymer is chemically resistant. The preferred properties of the polymer chosen will depend on use of the composite material. Each of these uses will dictate the range of acceptable physical properties for the polymers that will be employed. For instance, high levels of polymer viscosity may disfavor impregnation of ceramics. Preferably the polymer will be provided in a liquid form. Preferably the polymer will have a viscosity at room temperature in the range of from 10,000 to 3 centiPoise.

The level of corrosion protection required of the polymer will be dependent upon the specific electrode application. Hence, it is understood that almost all polymers have some degree of chemical resistance and the scope of the present invention therefore includes the wide range of organic polymers and the siloxane variety of inorganic fluoropolymers.

Suitable polymers for use in the present invention comprise (a) thermoplastics—resins which soften with heat and reharden upon cooling, (b) thermosetting resins—liquids or low-melting point solids which under the influence of energy, catalysts, or accelerators are transformed into solids (preferably insoluble solids), and (c) elastomers—polymeric materials that at room temperature can be stretched a significant portion of their length and upon immediate release will quickly return to their original length.

Thermoplastic polymers exhibiting good chemical resistance are chlorinated polyether, polyvinylidiene fluoride, polypropylene, polyether ether ketone, polyethylene, polyvinyl chloride, and chlorinated polyvinyl chloride. Chemically resistant thermosetting plastics include epoxy resins, furan resins, and vinyl esters. Elastomers such as chlorosulfonated polyethylene, fluoroelastomers, and polysulfide rubbers can withstand strong chemical attack as well. The scope of the present invention is not limited to use of these compounds but includes other polymers that have less chemical resistance. Such polymers can be used in electrode applications that correspond to reduced levels of corrosive activity. The formulation of the various aforementioned polymers is well known in the prior art. Many of the major commercial suppliers of polymer compounds such as DuPont, Dow Chemical, Huntsman and 3M provide extensive product information and application notes on the wide range of materials available.

An example of a solid polymer-forming liquid that is a polymer dissolved in solvent is a solution of polyvinylidene fluoride (PVDF) in a solvent combination of methyl isobutyl ketone, gamma-butyrolactone, dimethylformamide and dimethylacetamide.

The ceramic agglomerates may be impregnated with polymer precursors that may be cured insitu. This offers the advantages of lower viscosity and higher filling efficiency because all the material introduced into the porosity of the ceramic is polymerized to a solid form. Examples of solid polymer-forming liquids that are polymer precursors include the family of epoxy vinyl ester resins produced by Dow Chemical Company. The polymers produced from these formulations are remarkably resistant to organic solvents as well as a spectrum of corrosives including strongly oxidizing inorganic acids. A formulation particularly well suited for use in an electrochemical electrode is a mixture of epoxy vinyl ester resin that is 36 percent by weight styrene monomer and an organic peroxide catalyst such as the peroxyketal 1,1-bis(T-butylperoxy)3,3,5-trimethylcyclohexane produced by Atochem. Another such liquid form polymer precursor requires 100 parts dipolymer of vinylidiene fluoride and hexafluoropropylene to 30 parts of curing agent N,N'-dicinnamylidiene 1,6 hexanediamine. Upon cure, this combination produces a chemically resistant fluoroelastomer.

Because ceramics are refractory materials, the temperatures required in using molten thermoplastic impregnation do not pose a threat to the ceramic electrode.

Even the lower temperature at which titanium suboxides are oxidized to titanium oxide is higher than the melting point of most thermoplastics. A more significant consideration is the post-impregnation processing of the composite material. Higher melting temperatures favour the use of higher speed machining processing if these are required.

As outlined above, thermoset resins are particularly suitable for manufacturing of good conductivity material since they may be handled in a hot press, which can press the agglomerates together for intimate electronic contact, and they also shrink somewhat on curing, potentially pushing the particles together. Candidate thermoset resins include epoxyphenols, novolac resins, bisphenol A based epoxy resins, bisphenol F epoxy resins; polyesters (saturated, unsaturated, isophthalic, orthophthalic, neopentylglycol modified, modified vinylester, vinylester urethane and the like.

In one embodiment of the present invention, the polymer which is at least partially impregnated into the porous ceramic is an epoxyphenol novolac resin such as Araldite PY307-1 combined with HY3203 hardener, both of which are obtainable from Huntsman Limited.

In another embodiment of the present invention, the polymer is a vinyl ester, or an epoxy resin.

Preferably the agglomerates of the ceramic powder comprise at least 5% intra-agglomerate void volume space based on the total volume of the agglomerate. More preferably the agglomerates comprise at least 10%, at least 15%, at least 20%, at least 25%, at least 30% intra-agglomerate void volume space based on the total volume of the agglomerate.

As used herein the term "impregnated with the polymer" means the partial or complete filling of the pores or voids in the ceramic agglomerates with the polymer. Typically impregnation of the porous ceramic particles with the polymer imparts secondary properties onto the ceramic.

Preferably, at least 10%, at least 30%, at least 50%, at least 60%, at least 70%, or at least 80% of the voids or spaces in the agglomerates will be filled by the polymer, based on the total intra-agglomerate pore volume or void volume space. Typically at least 50% of the voids or spaces in the agglomerates will be filled by the polymer, based on the total intra-agglomerate pore volume void volume space. More preferably, at least 85%, at least 90%, at least 95%, or at least 99% of the voids or spaces in the porous agglomerates will be filled by the polymer, based on the total intra-agglomerate pore volume. Typically, it is advantageous for the voids to be filled as much as possible with the polymer. As outlined above, removal of entrapped air within the composite structure is advantageous in terms of imparting strength to the structure. For example, this is of particular use during denisification of the particles/agglomerates when pressing them to form a moulded body. It is also advantageous for avoiding "leakage" through the material when the material is a plate for an electrode for use in a battery. Leakage through an electrode plate results from the presence in the plate of a pathway for a liquid, such as battery acid, to penetrate through a plate from one side to the other. Clearly, it is desirable that there is no leakage of liquid through an electrode plate in a bipolar battery.

Vacuum, pressure and capillary forces may be used to impregnate the ceramic. Such methods are known in the art and include, for example Vacuum impregnation. A vacuum mixer may be used to impregnate the porous ceramics of the present invention. Preferably, the impregnation process is carried out at room temperature.

In one embodiment of the present invention, after impregnation of the ceramic agglomerates, the agglomerates undergo treatment to remove at least some of the first polymer attached to the surface of the particles. Such treatment may include manual removal of the polymer by ablation, chemical etching, rubbing or dusting the surface of the particles.

In an alternative embodiment, the impregnated ceramic agglomerates are not treated to remove any polymer which is coated on the outer surface of the particles.

Chemical additives and/or hardeners may be mixed with the polymer before the polymer is incorporated into the ceramic. Alternatively, or additionally, chemical additives and/or hardeners may be added after the ceramic has been impregnated with the polymer.

Suitable additives include: Glycidyl ethers such as n-butyl-, 2-Ethylhexyl-, O-Cresyl-, P-tertiary Butyl phenyl-, Nonyl Phenyl-, Neopentyl-, 1,4 Butanediol di-, and Dipropylene-glycidyl ethers. Trimethylolpropane-, trimethylolethane-caster oil-, and propoxylated glycerine-triglycidyl ethers, and mixtures of two or more thereof.

The polymer may comprise additional filler materials. The filler materials may improve the electrical conductivity of the agglomerates and consequently of any product made with them that relies on this property. For example, the filler may be finely ground carbon, copper or other conductive materials. Alternatively and/or additionally, an inert dielectric material may be used as filler material to substitute or "extend" the polymer, thereby saving on raw material costs, but whilst retaining an appropriate strengthening effect. Other suitable filler materials include electro-magnetic materials such as magnetite which may be of use for example in electric motor components.

Preferably the polymer comprises from 1 to 30% by weight of additional filler materials, based on the total weight of the polymer. More preferably, the polymer comprises from 1 to 10% by weight of additional filler materials, based on the total weight of the polymer.

In the present application, all the calculations (for example weight, volume, fillers and viscosity calculations) which refer to the polymer include, if they are present, any filler materials, curing agents or chemical additives which have been added to the polymer, for example to aid the solidification of the polymer from a liquid.

Preferably the agglomerates are discrete solid material in the range of from 0.1 to 2000 μm, preferably in the range of from 1 to 1000 μm. The particle size may be measured for example, by an optically-based particle size analyser such as a Malvern Mastersizer from Malvern Instruments Limited.

The composite material of the present invention preferably comprises at least 70%, at least 72.5%, more preferably at least 75% by weight of ceramic based on the total weight of the material.

The composite material of the present invention preferably comprises less than or equal to 30%, more preferably less than or equal to 27.5%, more still preferably less than or equal to 25% by weight of polymer based on the total weight of the material.

Shaping the mixture to form a preform may be carried out by moulding the impregnated agglomerates into a mould. Additionally, or alternatively, it may be carried out by densification of the agglomerates. Densification may occur for example by uniaxial compression moulding.

In one embodiment the pre-form is prepared by spreading the polymer/agglomerate mixture (which preferably has some granular or powder flow like characteristics) onto a foil sheet. The pre-form is then left for a sufficient a time and temperature until it has reached a handleable state. The pre-form may then be moved to a press. The foil may then be removed from the pre-form. The pre-form may be compacted into a plate which is suitable use as an electrode. In the compacted plate, the agglomerates are tightly packed together and preferably provide substantially uniform electrical conductivity throughout the plate. Preferably the foil comprises polytetrafluoroethylene(PTFE) or another suitable material.

Preferably shaping the mixture to form the pre-form does not involve the application of significant force. Preferably in order to shape the pre-form only manual pressure is applied to the pre-form, for example with a rolling pin or equivalent. Preferably less than 20 $Ncm^{-2}$, more preferably less than 10 $Ncm^{-2}$, more preferably less than 5 $Ncm^{-2}$ is applied to the mixture of step (iii) in order to shape it into the pre-form.

In one embodiment, the pre-form is preferably processed so that the polymer at least partially and preferably fully solidifies. The pre-form may be left for a sufficient a time and temperature until it has reached a handleable state, suitable for subsequent processing. This may involve leaving the pre-from for from 30 minutes to 1 day, or from 1 hour to 4 hours, or from 1 hour to 2 hours at a temperature of from 15 to 40° C., or from 20 to 30° C. By the term "handleable state" means that the pre-form is sufficiently rigid to be transferable (or moveable) for example, to a pressing tool, as a single body without the need for further support. If the pre-form has been at least partially set on a foil, the foil may easily be removed when the pre-form is in this state. Preferably the pre-form comprising the agglomerates comprising the at least partially, gelated polymer is then moulded to form the composite material. Preferably the pre-form is added to a mould, preferably a pre-heated mould. Pressure is then applied. The pressure may be in the range of from 250 to 3500 Ncm$^{-2}$, and is preferably about 2750 Ncm$^{-2}$. The temperature of the mould is preferably at least 35° C., and more preferably at least 70° C.

It will be understood that step (iv) may be carried out before step (v). Alternatively step (v) may be carried out before step (iv). Alternatively, steps (iv) and (v) may be carried out simultaneously.

The method of the present invention may further comprise subjecting the pre-form to pressure to form a compacted composite material. The pressure applied may be in the range of from 250 to 3500 Ncm$^{-2}$, and is preferably in the range of from 400 to 3000 Ncm$^{-2}$, and preferably about 2750 Ncm$^{-2}$. The temperature of the press for compacting the preform is preferably at least 35° C., and more preferably at least 70° C. Preferably the compacted composite material has a density in the range of from 2 to 3 gcm$^{-3}$, or from 2.1 to 2.6 gcm$^{-3}$.

It will be understood the term "treating the mixture to provide ceramic agglomerates which are at least partially impregnated with a solid polymer" includes allowing the polymer to solidify simply by leaving it at temperature of from 15 to 40° C., or from 20 to 30° C. The step of "treating the mixture to provide ceramic agglomerates which are at least partially impregnated with a solid polymer" results in the polymer solidifying. The treatment may involve allowing the polymer to cool, resulting in it solidifying. The treatment may involve allowing the solvent to evaporate such that the polymer dissolved in the solvent solidifies. Treating the mixture to provide ceramic agglomerates which are at least partially impregnated with solid polymer may comprise pressing and heating the mixture, preferably in a heated press. Treating the mixture to provide ceramic agglomerates which are at least partially impregnated with solid polymer may comprise curing the polymer.

Preferably the preform comprises agglomerates in a particulate form which are loosely bound together by residual polymer which has not impregnated the intra-agglomerate void volume space. Optionally the agglomerate particles may be bound together in the preform by the addition of further polymer.

The surfaces of the moulded (or compacted) body may be cleaned by processes such as grit blasting, applying corona discharge and plasmas, and other surface cleaning techniques In another embodiment the present invention provides a method of manufacturing a composite material, the method comprising:
(i) providing a ceramic powder comprising ceramic agglomerates, the agglomerates having an intra-agglomerate void volume space;
(ii) providing a polymer;
(iii) mixing the polymer with the ceramic powder to form a mixture comprising the agglomerates at least partially impregnated with the polymer, wherein the volume of polymer in the mixture is at least 80% of the total intra-agglomerate void volume space, but less than 130% of the total intra-agglomerate void volume space;
(iv) adding further polymer, preferably in an amount of from 1 to 10% by weight based on the total weight of the mixture;
(v) optionally shaping the mixture to form a preform;
(vi) treating the mixture to provide ceramic agglomerates which are at least partially impregnated with solid polymer;

The further polymer is preferably added in an amount of from 0.5 to 20% by weight based on the total weight of the mixture. The further polymer may be added in an amount of from 1 to 5% by weight based on the total weight of the mixture, or from 1 to 2% by weight based on the total weight of the mixture.

The further polymer added may have the same chemical composition as the polymer initially impregnated into the agglomerates, alternatively it may be different.

Preferably the further polymer is mixed with the pre-impregnated agglomerates comprising at least partially and preferably fully solidified polymer to form a dough. The dough may then be placed in a mould. Preferably a pre-heated mould. Pressure may then be applied. The pressure may be in the range of from 250 to 3500 Ncm$^{-2}$, and is preferably about 2750 Ncm$^{-2}$. The temperature of the mould is preferably at least 35° C., and more preferably at least 70° C.

The surfaces of the moulded body may be cleaned by processes such as grit blasting, applying corona discharge and plasmas, and other surface cleaning techniques.

When the composite material made by the present invention is for use in electrodes, preferably the agglomerates comprise electrically conductive ceramics. Preferably the composite material formed has electrical paths defined by the contacting conductive agglomerates. Preferably the electrically conductive ceramics comprise titanium suboxides of the formula $Ti_nO_{2n-1}$ where n is from 4 to 10. Preferably the size distribution of the agglomerates is 50% the mean agglomerate size.

When the composite material made by the present invention is for use in electrodes, preferably the composite material formed has no through-pores or defects. Preferably, it has a leakage current of less than 1 A/m$^2$. This is particularly the case when the composite material is formed into an electrode plate. Through-pores are defined as pathways (voids) through the composite material. Such pores or defects are undesirable as they reduce the electrical conductivity of the plates.

An example of an apparatus used for detecting the presence of through-pores within a bipolar electrode plate is as follows: the apparatus may comprise a rigid box open on the base. The open base is positioned over the electrode plate to be tested. An air tight seal is present between the box wall and the electrode. A port on the opposite side of the box allows water to be added, preferably to a depth of approximately 2 cm. A vacuum is then drawn (preferably to −200 mbar from atmospheric) between the electrode and the inside of the box. Any through-path defects (open pores) within the electrode are indicated by a trail of bubbles in the layer of water originating from the through-pores.

Preferably the electrode comprising the composite material of present invention has an overall electrical conductivity of at least 0.5 S·cm$^{-1}$. Preferably, it has an orthogonal conductivity of greater than 1 S·cm$^{-1}$.

The resistance value of electroplates made using pre-impregnated titanium sub-oxide agglomerates are preferably less than 10 mΩ, more preferably less than 5 mΩ. Resistance is measured using a DC 4 wire technique, using a 3.5 mm crown outer probe/spear inner Kelvin probes (Coda Systems PK3Qb-3.5). Force is applied to the probes using a mechanical jig to ensure consistent probe pressure. A 1 mA current is sourced through the plate and resulting voltage measured using a NI FlexDMM PXI-4072.

When conductive ceramics are used in the composite material of the present invention, the composite material may be used as a plate of an electrode. In which case, the method may further include the step of applying a battery paste to the electrode. Different amounts of paste may be applied to different areas of the electrode. A thin layer of metal may be applied to the electrode before the paste is applied. In one preferred technique the method includes applying the metal layer by electroplating and adding dispersoids to the plating solution. In another preferred feature the method includes the step of pressing a thin foil, say up to about 200 micron thick, of metal on to the surface of the electrode whilst in the moulding press and the polymer is curing. Other methods include plasma or flame spraying, sputtering, chemical vapour deposition and the like.

In one embodiment of the present invention the composite material formed is a free flowing powder comprising agglomerates of ceramic at least partially impregnated, and preferably fully impregnated with a polymer. Preferably the polymer is in a solid form.

These and other aspects of the invention will now be described with reference to the drawings in which:

FIG. 1: shows a low magnification SEM micrograph of EBONEX® ceramic (made of agglomerate) raw material (before pre-impregnation with a polymer). Spaces between the agglomerates constitute the "inter-particle" porosity.

Figure 2:
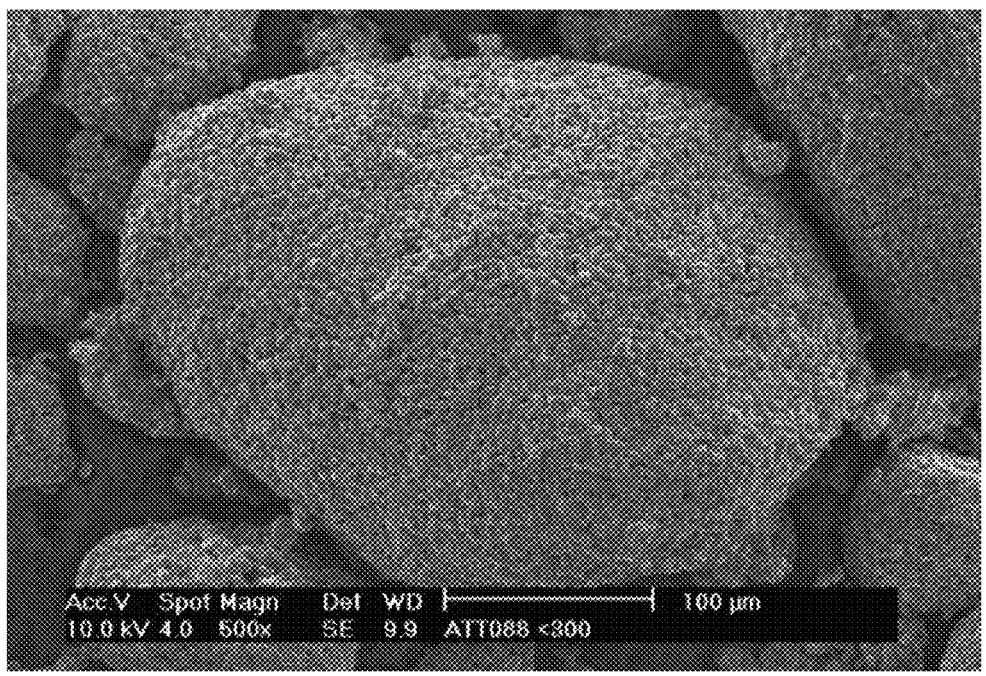
FIG. 2: Medium magnification SEM micrograph of ceramic raw material.

FIG. 2: shows a medium magnification SEM micrograph of EBONEX® ceramic. Spaces between the agglomerates constitute the "inter-particle" porosity. The agglomerates at this magnification show porous surfaces—this constitutes part of the "intra-particle" porosity (open capillaries)—pre-impregnation fills or at least partially this porosity as outlined in the present invention.

Figure 3:
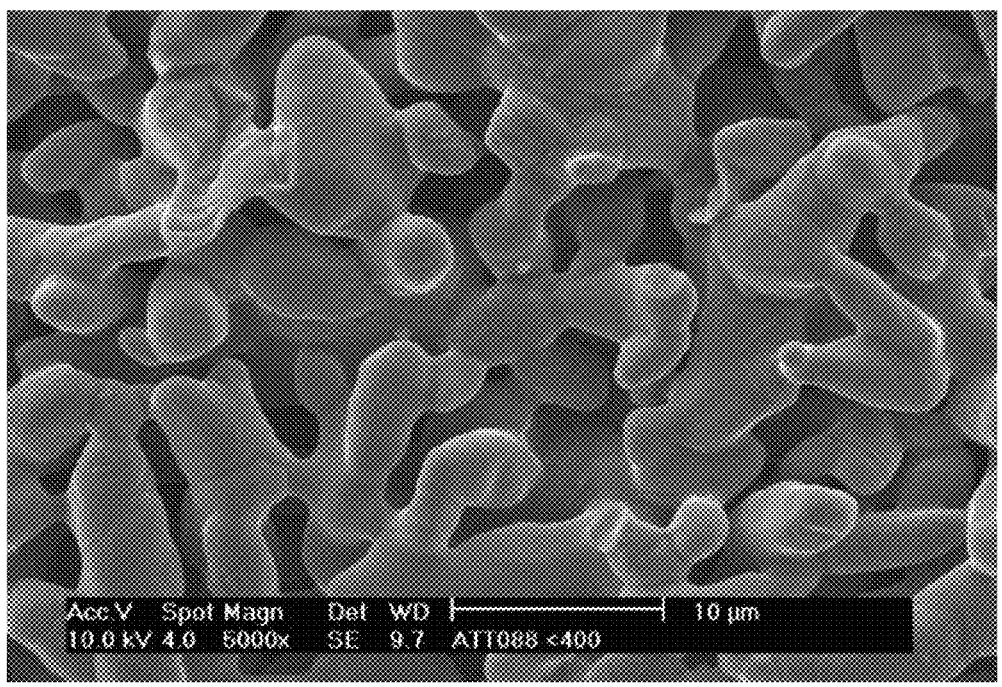
FIG. 3: SEM micrograph of ceramic material detailing the surface of an agglomerate.

FIG. 3: shows an SEM micrograph of EBONEX® ceramic detailing the surface of an agglomerate. The surface of the agglomerate at this magnification clearly shows porosity; this constitutes part of the "intra-particle" porosity (open capillaries)—the pre-impregnation process as outlined in the present invention fills this.

Figure 4A:
FIG. 4: Micrographs of loose ceramic powder.
Figure 4B:
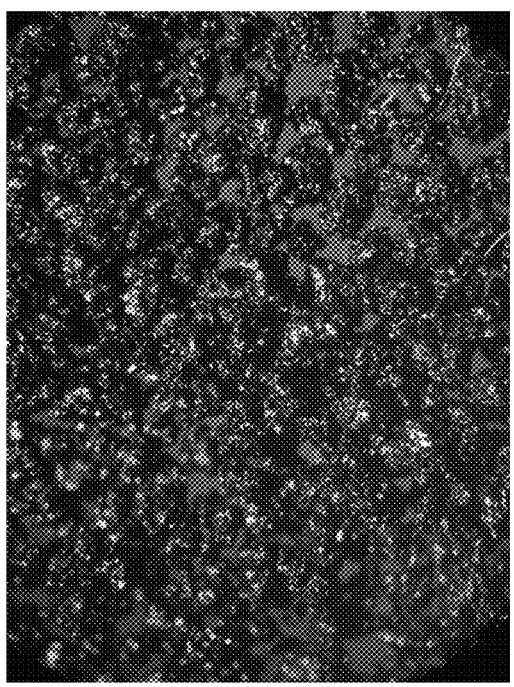

FIG. 4: shows a micrographs of loose, EBONEX® powder (made of agglomerate) 'before' versus 'after' impregnation with a liquid epoxy system. Optical micrographs comparing pre-impregnation levels; 21% (left) and 23% (right) by weight epoxy. The lower level of epoxy addition has retained a matt texture to the EBONEX® agglomerates surface. At the 23% epoxy level the surfaces have become glossy indicating saturation of the intra-agglomerate porosity is complete.

Figure 5:
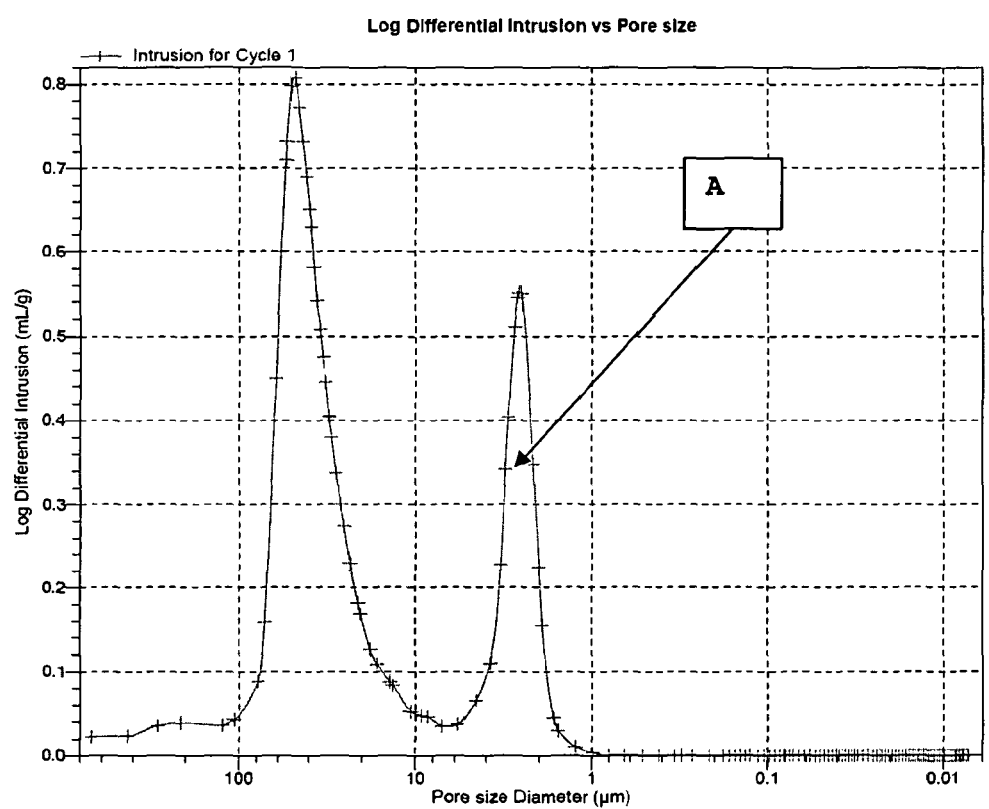
FIG. 5: Mercury porosimetry data.

FIG. 5: shows Mercury porosimetry data. This graph clearly shows a bimodal distribution in pore size within an EBONEX® powder. The right-hand peak represents the intra-agglomerate pore size diameters (labelled A) (measured in μm), the left-hand peak represents the inter-agglomerate pore size diameters (measured in μm). The difference between intra-agglomerate and inter-agglomerate void volume space can also be seen with reference to the SEM micrographs shown in FIG. 3.

Figure 6:
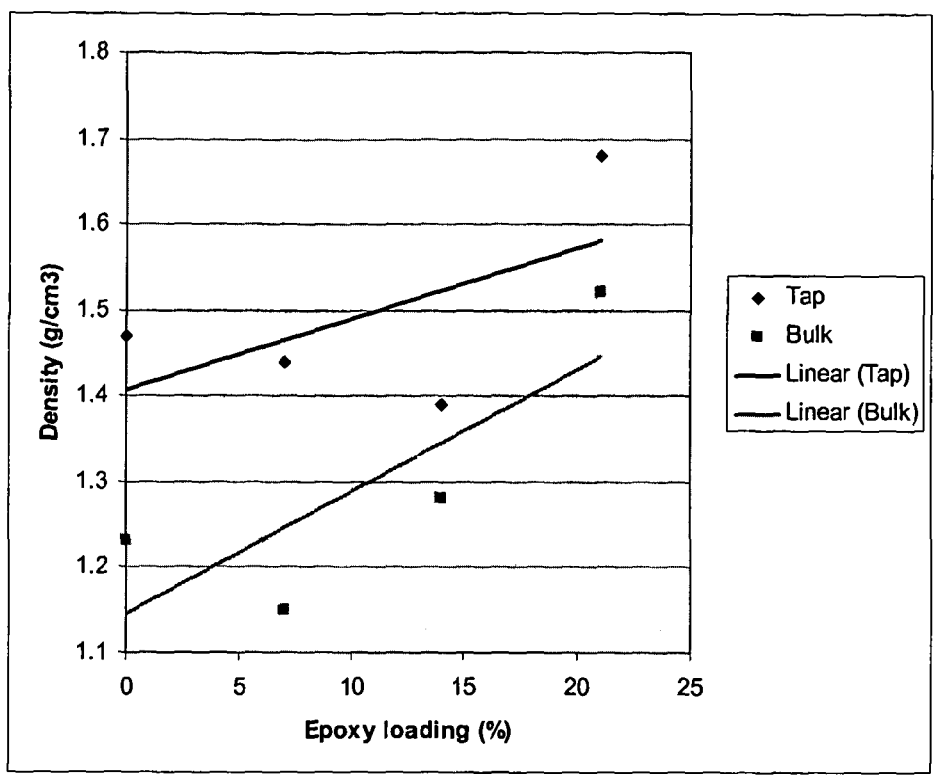
FIG. 6: Plot of the density data discussed in Example 1 and Table 1.

FIG. 6: shows a plot of the density data discussed in Example 1 and Table 1.

In another aspect the invention provides an electrode comprising the composite material as defined herein.

In another aspect the invention provides a battery comprising the composite material as defined herein. The battery may comprise an electrode which comprises the composite material as defined herein.

Preferably the battery comprises a plurality of electrodes and an acid electrolyte.

With pasted and cured plates, a battery is assembled using a number of bipolar plates, appropriately oriented, and a single positive monopole at one end and a single negative monopole at the other. Absorptive glass mats can be advantageously inserted between each plate. Sealing of the plates is achieved in the laboratory by the use of gaskets of appropriate thickness and made of say butyl or silicone rubber sheet. The entire assembly is held together by metal straps and bolts of suitable length. In a commercial battery, in a preferred feature of the invention, the plates are sealed into a pre-moulded plastic container, with slots for each plate. A certain amount of compression of the glass mat and of the paste can be engendered by correct dimensioning of the container. Such compression has been found to aid the adhesion of the paste to the bipolar electrode material. Low concentration sulphuric acid can be added followed by a lid having grooves which will seal onto the edges of each plate, placed on the top. The lid can advantageously also contain a suitable gas pressure regulating system.

The battery is then electrically formed in the usual way. As the formation takes place, then the acid increases in strength, by the conversion of the sulphate-containing paste to $PbO_2$ on the positive plate and Pb metal on the negative. The initial strength of the sulphuric acid should be chosen to ensure that the final strength of the acid is in the range 30-40% by mass of sulphuric acid, or even higher.

Phosphoric acid can also be advantageously added in part or total replacement of the more usual sulphuric acid.

Batteries made by this method have high power and energy density (W/m3, Wh/m3), high specific power and energy (W/kg, Wh/kg.) They have high cycle life, even in deep discharge conditions, and can be manufactured cheaply with conventional technology.

In one aspect of the present invention there is provided discrete particles, a powder, or an agglomerates comprising a ceramic which is at least partially impregnated with a polymer. Preferably the ceramic is a conductive ceramic.

The present invention will be further illustrated with reference to the following non-limiting Examples.

Example 1

Preimpregnation 2 kg of EBONEX® powder (titanium suboxide powder comprising $Ti_4O_7$, $Ti_5O_9$ and $Ti_6O_{11}$, wherein the $Ti_4O_7$, $Ti_5O_9$ and $Ti_6O_{11}$ provide over 92% of the powder, and wherein the $Ti_4O_7$ is present at above 30% of the total powder) was inserted into the mixing chamber of a mixer. The mixer used is from Winkworth Machinery Limited and is of 2 liter capacity, twin z-blade mixer. (A ribbon-U trough mixer may also be used from the same company).

A sufficient (that is to fill the intra-agglomerate porosity) level of epoxy was then added to the EBONEX® powder in 3 stages separated by 3×5 minute mixing stages. A sample of the mix was then examined under the microscope to confirm that the full pre-impregnation of the agglomerates had taken place (see FIG. 4). The impregnated agglomerates retained some granular-flow characteristics. The bulk density of the agglomerates were measured according to ASTM 1895-96 Standard Test methods for Apparent Density, Bulk Factor and Pourability of Plastic Materials and the results are shown in Table 1. This indicates that the intra-agglomerate porosity has been essentially filled by the polymer and that as a consequence, the bulk density is increased by approximately 23%.

TABLE 1

| Epoxy Level (% by weight) | Bulk Density (g/cm$^3$) | Tap Density (g/cm$^3$) |
| --- | --- | --- |
| 0 | 1.23 | 1.47 |
| 7 | 1.15 | 1.44 |
| 14 | 1.28 | 1.39 |
| 21 | 1.52 | 1.68 |

Further Treatment

The mix was then separated in to individual aliquots which were subsequently shaped in to pre-forms utilising a stencil of suitable dimensions. The pre-forms were then allowed to gel. This pre-form was then inserted in to a match metal mould tool and then subsequently pressed and cured. The subsequent substrates were then tested for resistance and found typically to have values below 10 mΩ.

Example 2

The method was carried out as outlined in Example 1 but with the additional stage of partially curing at ambient temperature (typically between 15 and 35° C.) the pre-impregnated agglomerates and then adding an amount of fresh polymer which is mixed using the same apparatus as in Example 1. The subsequent stages (i.e. the steps outlined under the title "further treatment") remain as in Example 1.

Example 3

Following the pre-impregnation technique as outlined in Example 1 the powder was left to cure with gentle periodic motion for several hours at ambient temperature. The powder was then heated in an oven at approximately 110° C. until a full cure of the polymer was achieved.

The resultant powder could then be mixed with a second polymer and subsequent pressing as outlined in Example 1 to achieve a similar substrate.

Result

The resulting substrates were devoid of through-paths and had a similar resistance level as indicated in Example 1.

The invention claimed is:

1. A method of manufacturing a composite material, the method comprising:
 (i) providing a ceramic powder comprising ceramic agglomerates, the agglomerates having an intra-agglomerate void volume space;
 (ii) providing a polymer comprising resin and one or more curing agents;
 (iii) mixing the polymer with the ceramic powder to form a mixture comprising the agglomerates at least partially impregnated with the polymer, wherein the volume of polymer including said resin and said one or more curing agents in the mixture is at least 80% of the total intra-agglomerate void volume space, but less than 130% of the total intra-agglomerate void volume space;
 (iv) optionally shaping the mixture to form a preform; and
 (v) treating the mixture to provide the composite material, wherein the composite material comprises the ceramic agglomerates which are at least partially impregnated with solid polymer;
 wherein the ceramic agglomerates constitute 70% to 90% by weight of the composite material; and
 wherein the ceramic agglomerates comprise electrically conductive ceramics which are ceramic compounds which exhibit electrical conductivity or are non-electrically conductive ceramic compounds doped to exhibit electrical conductivity.

2. The method of claim 1 wherein the volume of polymer used in step (iii) is from 90% to 110% of the total intra-agglomerate void volume space.

3. The method of claim 1 wherein the volume of polymer used in step (iii) is from 95% to 105% of the total intra-agglomerate void volume space.

4. The method of claim 1 wherein the mixture formed in step (iii) is in particulate form or agglomerate form.

5. The method of claim 1 wherein the resin is a curable resin and the mixture of step (iii) is at least partially cured before adding further curable resin and shaping into the preform.

6. The method of claim 1 wherein after formation of the mixture in step (iii), further resin is added in an amount of from 1% to 10% by weight based on the total weight of the mixture.

7. The method of claim 1 wherein the treating of the mixture to provide ceramic agglomerates which are at least partially impregnated with solid polymer comprises pressing and heating the mixture.

8. The method of claim 1 wherein the mixture of step (iii) is shaped onto a foil to form the preform.

9. The method of claim 1 wherein the electrically conductive ceramics comprise one or more ceramic compounds selected from titanium suboxide, titanium diboride, zirconium diboride, titanium nitride, titanium carbide, boron oxide, nickel oxide, lithium ferrite, magnesium ferrite and mixtures of two or more thereof.

10. The method of claim 1 wherein the mixture in step (iii) contains additional non-conductive ceramic filler, non-ceramic filler or glass fibres.

11. The method of claim 1 wherein the electrically conductive ceramics comprise titanium suboxide having the formula $Ti_nO_{2n-1}$ where n is a number from 4 to 10.

12. The method of claim 1 wherein the resin is a curable resin and wherein the treating of the mixture to provide ceramic agglomerates which are at least partially impregnated with solid polymer comprises at least partially curing the resin.

13. The method of claim 12 wherein the curable resin is selected from one or more of an epoxyphenol, a novolac resin, a bisphenol A based epoxy resin, a bisphenol F epoxy resin, a polyester or a mixture thereof.

14. The method of claim 1 wherein step (iii) is carried out at a temperature in the range of from 15° C. to 40° C.

15. The method of claim 1 wherein the ceramic agglomerates are impregnated with the polymer in the presence of a vacuum.

16. A composite material obtainable by the method of claim 1.

17. An electrode comprising the composite material made by the method defined in claim 1.

18. The electrode of claim 17 having an overall electrical conductivity of at least 0.5 S·cm$^{-1}$.

19. The electrode of claim 17 having an orthogonal conductivity of greater than 1 S·cm$^{-1}$.

20. The electrode of claim 17 having a leakage current of less than 1 A/m$^2$.

21. A battery comprising the electrode as defined in claim 17.

22. The method of claim 1 wherein the ceramic agglomerates comprise said ceramic compounds which exhibit electrical conductivity.

23. The method of claim 1 wherein the ceramic agglomerates comprise said non-electrically conductive ceramic compounds doped to exhibit electrical conductivity.

* * * * *